US005574585A

United States Patent [19]

Thaler et al.

[11] Patent Number: 5,574,585

[45] Date of Patent: Nov. 12, 1996

[54] TRANSMISSION METHOD AND APPARATUS FOR AN INFRARED REMOTE CONTROL SYSTEM

[75] Inventors: Markus Thaler, Hirzel; Urs Jost, Altendorf; Stefan Sigrist; Peter Schmid, both of Horgen, all of Switzerland

[73] Assignee: Feller AG, Horgen, Switzerland

[21] Appl. No.: 588,583

[22] Filed: Jun. 28, 1995

Related U.S. Application Data

[63] Continuation of Ser. No. 961,681, Jan. 19, 1993, abandoned.

[30] Foreign Application Priority Data

May 30, 1991 [CH] Switzerland ............ 1597/91
May 30, 1991 [CH] Switzerland ............ 1599/91
May 30, 1991 [CH] Switzerland ............ 1600/91

[51] Int. Cl.[6] ............ H04B 10/00

[52] U.S. Cl. ............ 359/142; 359/147; 340/825.72

[58] Field of Search ............ 359/142, 143, 359/146, 147, 148; 340/825.69, 825.72; 307/296.3; 455/68, 69, 70

[56] References Cited

U.S. PATENT DOCUMENTS 3,894,229 7/1975 Mouri ............ 359/142
4,385,296 5/1983 Tsubaki et al. ............ 340/825.72
4,426,662 1/1984 Skerlos et al. ............ 359/142
4,514,732 4/1985 Hayes, Jr. ............ 359/142
4,623,887 11/1986 Welles, II ............ 359/148
4,626,848 12/1986 Ehlers ............ 359/148
4,663,626 5/1987 Smith ............ 340/825.69
4,833,467 5/1989 Kobayashi et al. ............ 359/142
4,850,046 7/1989 Philippe ............ 359/142
4,856,081 8/1989 Smith ............ 359/145
4,914,517 4/1990 Duffield ............ 359/146
5,189,543 2/1993 Lin et al. ............ 359/142

OTHER PUBLICATIONS

William Pierce, Remote Controller needs only two ICs, Jan. 1983, Electrical Design News.
G. Torelli et al, 'PCM remote control chips detect transmission errors' Electronic Engineering Apr. 1983.
'Une barriere–télécommande á infrarouges' Electronique Radio Plans Aug. 1990.

*Primary Examiner*—Wellington Chin
*Assistant Examiner*—Rafael Bacares
*Attorney, Agent, or Firm*—Watson Cole Stevens Davis, PLLC

[57] ABSTRACT

For the transmission of signals triggered by long key depressions from a transmitter to a receiver, repeat signals (R) are transmitted while the key is held down. Releasing the key triggers a separate shift signal (S).

A burst-pause modulation method is used to transmit the repeat and shift signals (R) and (S).

Information units are defined here by different lengths of the burst intervals. The burst intervals and the burst packets are selected in such a way that infrared transmitters with a limited power supply can be used.

9 Claims, 8 Drawing Sheets

TRANSMISSION METHOD AND APPARATUS FOR AN INFRARED REMOTE CONTROL SYSTEM

This application is a File Wrapper Continuation application of application Ser. No. 07/961,681, filed 19 Jan. 93 and now abandoned.

FIELD OF THE INVENTION

The present invention relates to a transmission method for an infrared remote control system for the transmission of data sequences or telegrams, triggered by long and short key actuations on a keypad, between a transmitter and a receiver, where the different key depressions on the keypad are interpreted.

PRIOR ART

Pseudo-continuous operations, for example sequential cycling through a series of discrete actuation values, are conventionally controlled during a key depression, for example in the case of a remote controller, by transmission of one command per step, or by the transmission of a few commands, the non-arrival of a command within a specific time being interpreted as the end of the key depression, or by the transmission of the beginning and end of the key depression.

So-called transmission protocols are used for the transmission of binary-coded data groups or data sequences, that is to say data which are represented by on and off states. In this case a station transmits such data sequences with the aid of high-frequency waves for example, and a receiving station evaluates the data sequences received, for which it must know the transmission protocol. The latter essentially defines the form and the content of the transmitted data and only then is it possible for such data to be evaluated.

A wide variety of such protocols are known and are used throughout the data communications field. The large number of different protocols is primarily attributable to the variety of applications, such as data transmission of computer information or pure control information for equipment for example. In particular, data protection, integrity and signaling rates are also the determining factors, which sometimes hinder one another. The transmission medium must likewise be taken into account.

The object of the invention is to find a transmission method which ensures a reliable transmission of a long key depression with the smallest possible number of commands, the end of the key depression being detected as precisely as possible, and which requires only a limited amount of power.

SUMMARY OF THE INVENTION

This object is achieved according to the invention in that repeat signals R are repeatedly transmitted by the transmitter from the depression until the release of the key on the keypad, the release of the key generating a separate shift signal S and terminating the transmission of the repeat signals R, and in that a burst-pause modulation method is provided in the transmitter for the transmission of the repeat and shift signals R and S, in which the number of burst periods per burst packet of the duration TB, and the burst intervals TA0, TA1 . . . are selected in such a way that a storage means which provides the required power and voltage amplitude for the transmission is charged by means of a DC/DC transformer during the pauses despite a power supply with low voltage and capacitance.

A preferred embodiment of the invention is one wherein a circuit is provided which interprets in the receiving device the non-appearance of a repeat command not as the end of the key depression but only as an interruption.

A further preferred embodiment of the invention is one wherein the first repeat signal is transmitted after a key depression longer than 400 milliseconds and is repeated at intervals of at most 1 second until the key is released.

A special preferred embodiment of the invention is one wherein a circuit is provided in the receiver, which circuit generates a number of discrete control signals after receiving a repeat signal during at least one interval of the repeat signals.

By virtue of the transmission method according to the invention, pseudo-continuous operations can be reliably controlled with the aid of a long key depression, of several seconds for example, at the transmitting device. If the reception of the repeat signal is interrupted, the operation is not terminated, but merely interrupted, and can be continued once repeat signals are received again. As a result, for example in the case of a light control device, a dimming operation which is initiated and continued by means of a long keys depression, is not terminated due to the interruption of the send signal, for example as the result of a temporary covering of the transmitter-receiver connection, but is merely interrupted. As soon as further repeat signals are received, the dimming operation is continued in the original direction. In the case of a light control for example, when the key is released a shift signal is transmitted as a separate command. Said shift signal indicates the end of the current operation, for example of the dimming operation illustrated. It is thus possible, for example, to reverse the direction of the dimming function, and the next repeat signals received cause a dimming effect in the opposite direction to the original one. The preferred embodiments of the invention envisage the use of 16 periods per burst packet, and the pause interval being at least 10 times the length of the burst packet.

A further preferred embodiment envisages that four different information units with four different burst intervals are used, one information unit being used in each case to mark the beginning and the end of the data sequence and to represent the states 0 and 1.

By virtue of the method according to the invention, it is possible to transmit telegrams or data sequences reliably even with transmitters having a weak power supply. It is then possible for the transmitter to refresh its energy store during the burst intervals in order to transmit the next burst packet with sufficient power. Thus, the energy store need no longer be dimensioned so large as to ensure an uninterrupted transmitting capacity. Energy stores with smaller dimensions are also noticeably smaller in their dimensions and weight than larger energy stores, which means reduced dimensions and smaller weight, and thus greater ease of operation, for hand-held transmitters in particular.

DESCRIPTION OF THE INVENTION

An exemplary embodiment of the invention will be explained in greater detail below with reference to drawings, in which:

FIG. 1 show a block circuit diagram of the transmitter according to the invention, FIG. 2 shows the total address range of the transmitter, FIG. 3 shows the telegram structure of a telegram to be transmitted, FIG. 4 shows the circuit diagram for the transmitter power supply, FIGS. 5, 6 show the PPM coding and the modulated PPM signal of the transmitter, FIG. 7 shows a block circuit diagram of the receiver according to the invention, FIG. 8 shows a block circuit diagram of the preamplifier, FIG. 9 shows a diagram of the signal transmission depending on a long T key depression and the corresponding light control, and FIG. 10 shows a diagram of the signal transmission depending on a short key depression and the corresponding ON/OFF control.

DESCRIPTION OF THE PREFERRED EMBODIMENTS

Figure 1:
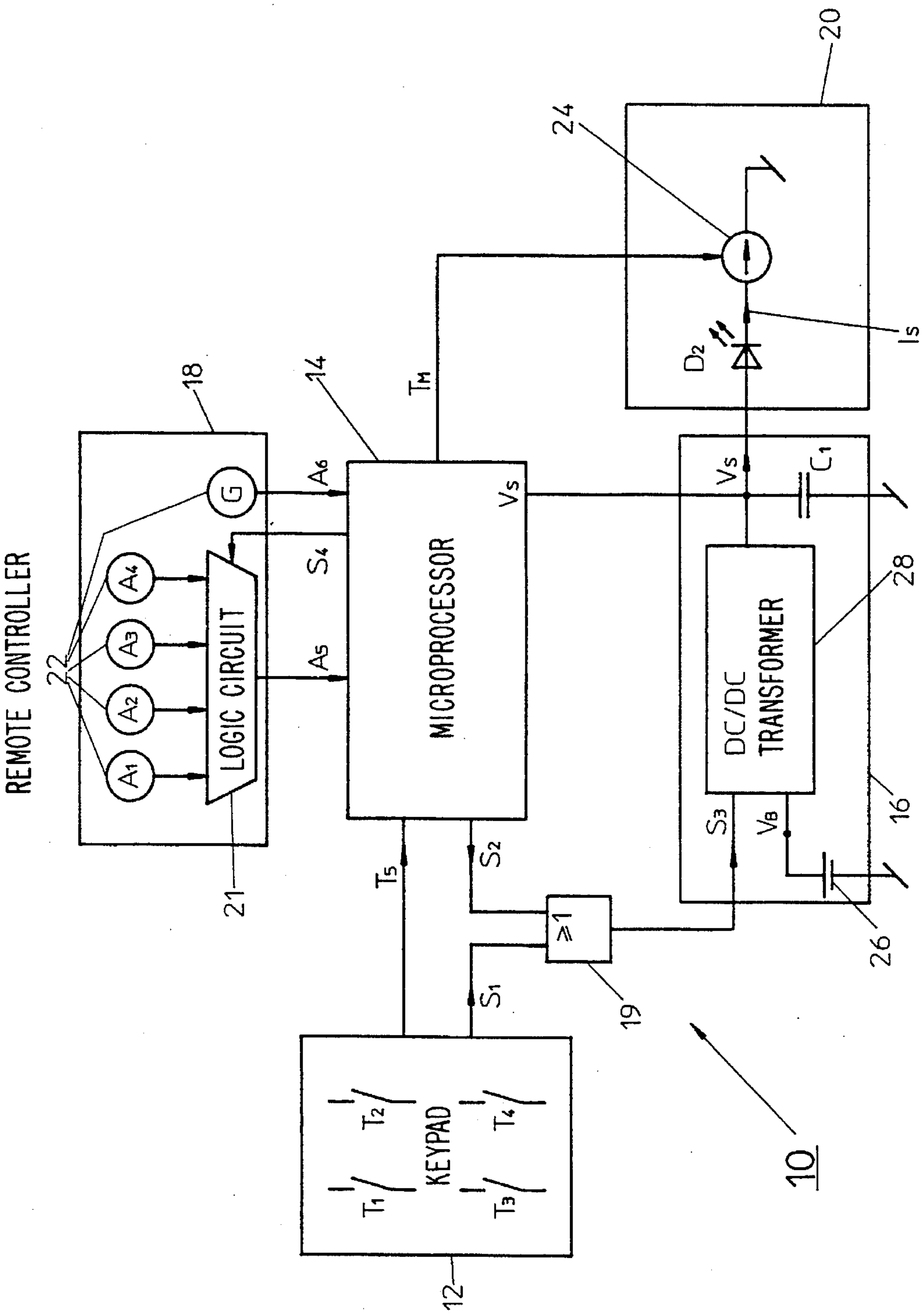

FIG. 1 shows the block circuit diagram of the transmitter 10. The transmitter 10 is for example an infrared transmitter for controlling various electrical consumers such as light fixtures, audio equipment and window blinds. The transmitter 10 comprises a keypad 12, a first microprocessor or ASIC 14, a power supply 16, an address presetting means 18 and a transmitter stage 20.

When any key on the keypad 12 is pressed, the power supply 16 is activated by a first control signal S1 of the keypad 12 and establishes the supply voltage VS required for the microprocessor or ASIC 14 and for driving the transmit diode D2 of the transmitter stage 20. As soon as the power supply 16 has reached the required voltage, the microprocessor or ASIC 14 starts up and assumes control of the power supply 16 with a second control signal S2. The output signal T5 of the keypad 12 is read in by the microprocessor or ASIC 14 and indicates which key on the keypad 12 was pressed.

The first control signal S1 and the second control signal S2 are assigned to a logic OR circuit 19, which generates a third control signal S3 which activates the power supply 16.

The microprocessor or ASIC 14 then generates a fourth address control signal S4 with which the device address A1, A2, A3, A4 . . . set at the address presetting means 18 with the aid of coding switches 22 is selected by a logic circuit 21.

Figure 2:
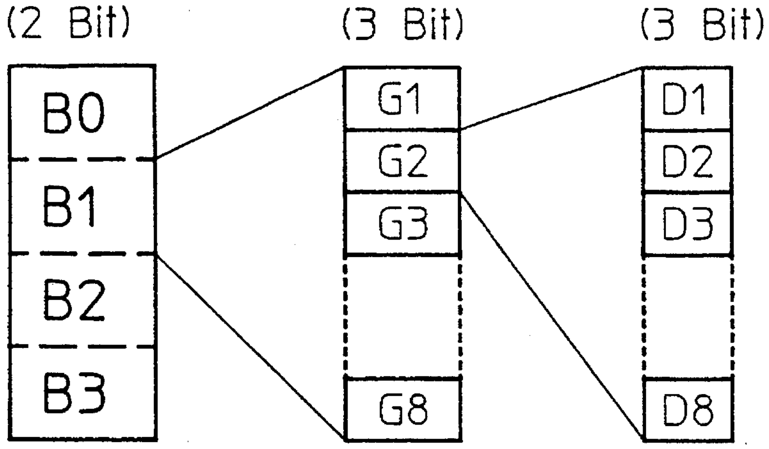

The addresses are represented by eight address bits for example, the address space (see FIG. 2) being logically divided into four banks (2 bits) each with eight groups (3 bits) with eight device addresses (3 bits) each.

In each case one group address G can be set at the transmitter 10 with a coding switch 22, and four device addresses can be freely selected within said group. The bank address is hard-wired.

The transmission of commands between the transmitter 10 and the receiver of a control device is based on individual data sequences or telegrams (one command is transmitted per telegram), in which the information is digitally encoded.

Figure 3:
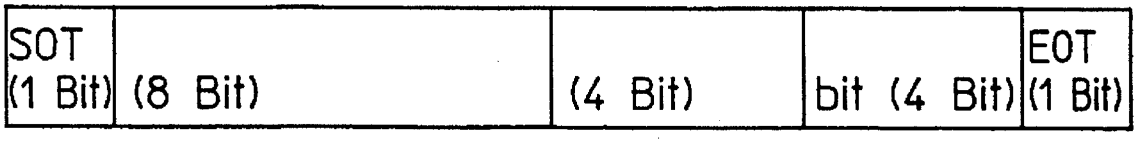

The telegram structure of a telegram is shown in FIG. 3. A telegram comprises:
eight address bits
four data bits
four data protection bits (CRC coding)
one start bit SOT (start of telegram)
one stop bit EOT (end of telegram).

The start bit SOT and the stop bit EOT are used for synchronization purposes, so that the beginning or the end of a telegram is clearly detected.

Each key of the keypad 12 is assigned to exactly one of said device addresses. The device address specified in the output signal A5 of the logic circuit 21 determines the three least significant bits of the address field in the telegram (FIG. 3). At the same time the group address G set with the coding switch 22 is read in and determines the three most significant address bits of the telegram. The two most significant bits of the address field are filled with corresponding bank addresses. The four data bits are used to represent the corresponding commands in accordance with the length of the key depression on the keypad 12. The address and data field thus generated is supplemented by the further bits for data protection (CRC coding) and the telegram (FIG. 3) is thus formed.

The microprocessor 14 performs burst-pause modulation (pulse position modulation and subsequent carrier frequency modulation), and generates a transmission control signal TM to drive a transmit amplifier 24 connected in series with the transmit diode D2.

Said transmit amplifier 24 generates the transmission current IS through the diode D2, which generates light signals in the infrared range in accordance with the current. Since the power supply cannot make sufficient power available to generate the transmission current IS, a capacitor C1 is used to store the energy temporarily, said capacitor being dimensioned such that a whole telegram can be transmitted with at least the current intensity IS.

As soon as no further telegrams need be transmitted as a result of the key depression (key released), the microprocessor or ASIC 14 deactivates the power supply 16 by means of the second control signal S2, whereupon the power consumption can be reduced to a negligible value in the standby mode.

Figure 4:
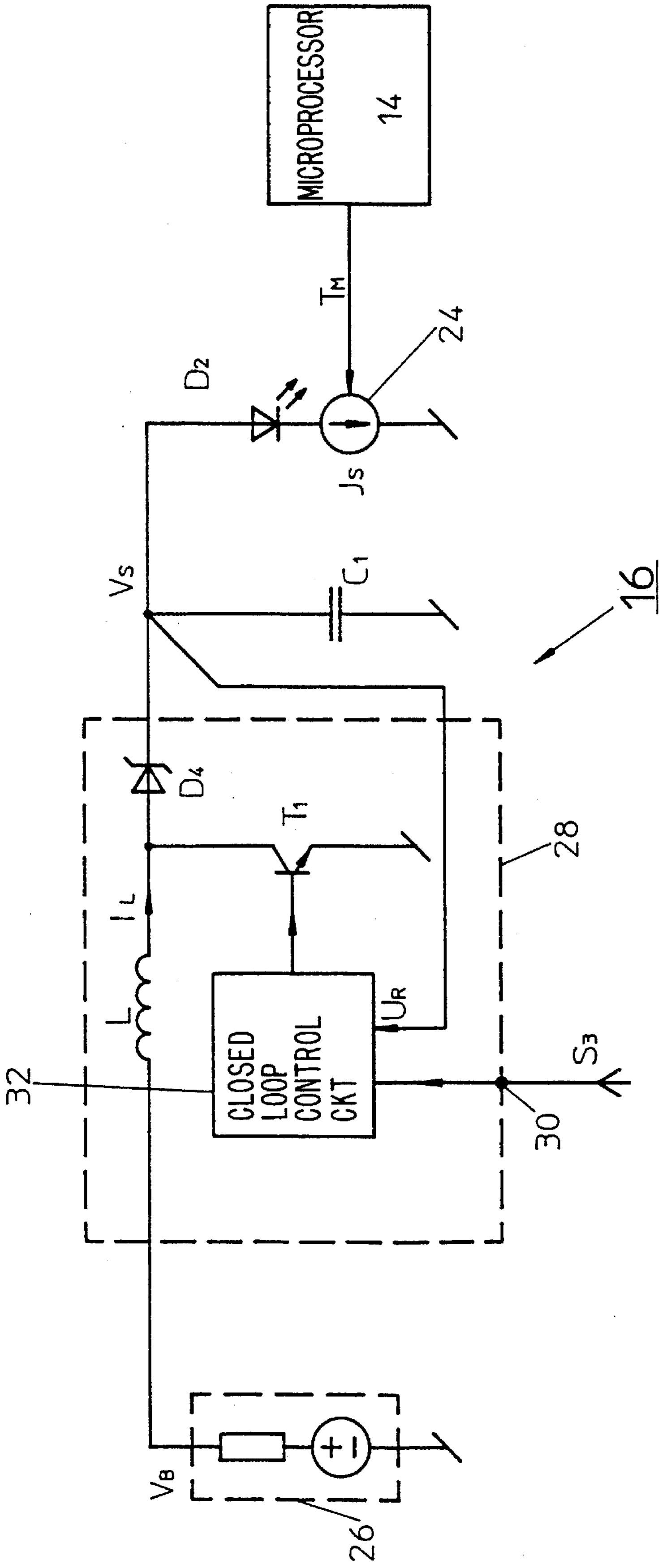

The circuit of the power supply 16 is illustrated in FIG. 4.

Only a battery 26 with a low voltage (1.5 volt cell) is used to supply power to the transmitter 10. However, a higher voltage is required to drive the infrared transmit diode D2 and the microprocessor or ASIC 14. This is achieved in that connected downstream of the battery 26 is a magnetic DC/DC transformer 28 which transforms the low input voltage VB to a higher voltage level VS. A closed-loop control circuit 32 is activated via the control input 30 of the third power supply control signal S3, with the result that a transistor T1 is switched on and a current IL begins to flow through a coil L. A quantity of energy proportional to the current is stored in the coil L. If the transistor T1 is now switched off, the energy in the coil decays and flows off through a diode D4 into the capacitor C1, whereupon a voltage begins to become established across the capacitor C1. Packets of energy are transferred into the capacitor C1 by repeatedly switching the transistor T1 on and off, and the voltage is thus gradually built up. This is continued until the desired voltage VS has been established across the capacitor C1. The closed-loop control circuit 32 determines that the desired voltage has been reached and terminates the period switching on and off of the transistor T1, to be precise until the control voltage UR falls below a predetermined value. The periodic switching on and off is generated by an oscillator, it also being possible to use the coil L as the frequency-determining component. The oscillator is built into the closed-loop control circuit 32.

When the infrared transmitter 10 is activated, the voltage transformer 28 is set in operation. The voltage of the battery 26 is thus transformed to the desired higher voltage level VS and is preferably stored as energy store in the capacitor C1. After a defined period of time, the telegram to be transmitted is transmitted by means of the controlled transmit amplifier 24 and the infrared diode D2, and the capacitor C1 is consequently partially discharged again. As a result it is possible to make do with, for example, a single 1.5 volt cell as the energy source. The IR transmitter 10 can therefore be built smaller than hitherto, or else have more space available for the transmission electronics. Also, fewer batteries need be exchanged.

Figure 5:
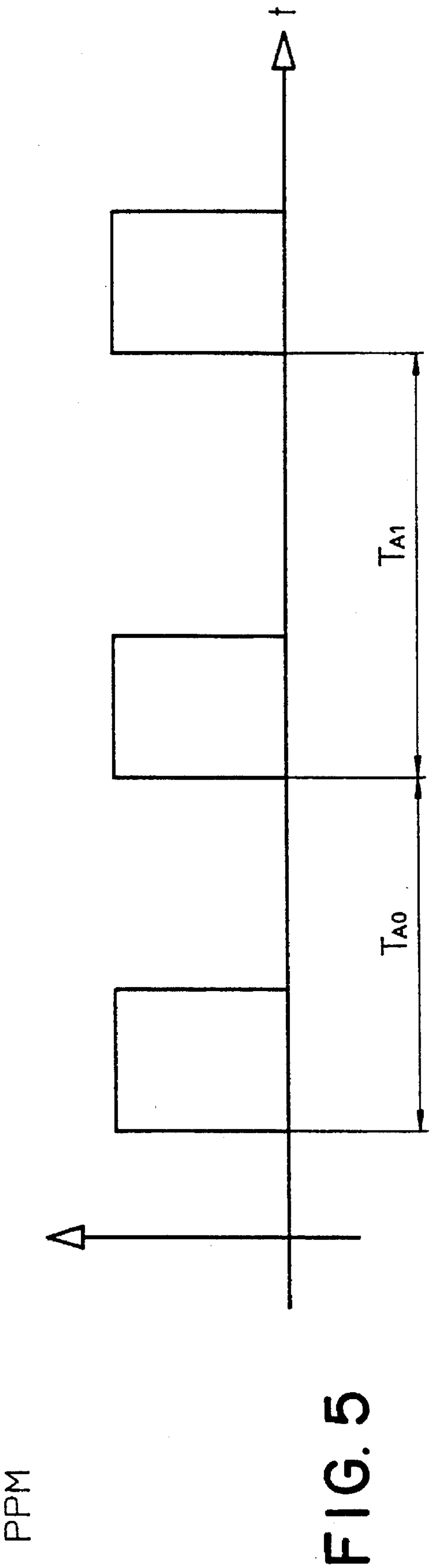
Figure 6:
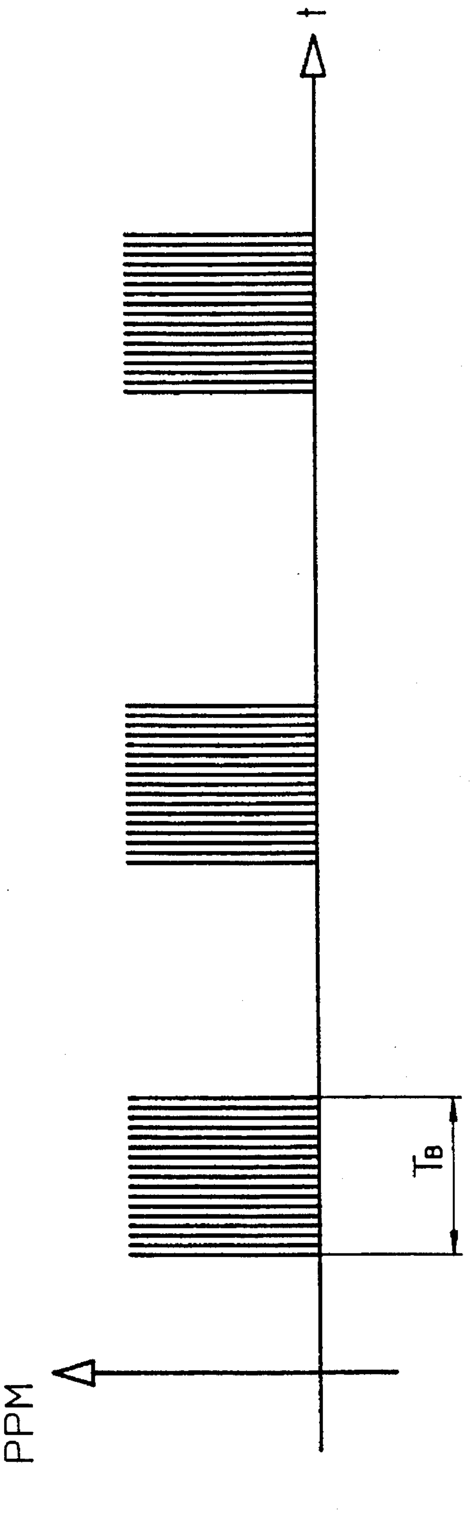

The telegram transmission method is illustrated diagrammatically in FIGS. 5 and 6.

Only a limited power supply is available (battery, 1.5 V, type AAA) in the transmitter 10, so the transmission method must be selected such that the required range (approx. 20 m) and the life (approx. 3 years under normal conditions of use) can be maintained for the battery 26.

The telegram is transmitted using a burst-pause modulation method. For this transmission, the individual bits are coded with a PPM method (pulse position modulation) in the microprocessor 14 and are subsequently modulated with a carrier frequency. With this type of coding the information carrier is the interval between two pulses (TA0, TA1, FIG. 5).

Overall four different intervals are used: EOT, "0", "1" and SOT. Since the unmodulated PPM method is broadband, the individual pulses are modulated with a carrier frequency (447.5 kHz), to be precise in such a way that 16 periods of the carrier frequency are transmitted per pulse. Such a pulse packet is termed a burst with the burst length TB (32 us). The modulated PPM signal (FIG. 6) is termed the BPM signal (burst position modulation). This coding and modulation method is very energy-saving since power is only consumed during the burst phases and the intervals between the bursts (TA0, TB, TA1-TB, etc.) can be used to refresh a temporary energy store at least partially, especially when the burst intervals are selected to be much longer than the burst length.

Stop bit EOT:14*TB
Bit 0:19*TB
Bit 1:24*TB
Start bit SOT:29,TB A burst packet of the duration TB has, for example, 16 periods, that is to say 16 short flashes of light are transmitted by the IR transmit diode D2. After an interval of the duration TA0, a second burst packet is transmitted once more. The burst intervals TA0, TA1 are selected so that the transmitter 10 has enough time, namely TA0-TB, to make the energy still missing available for the transmission of the following burst packet if it does not have a sufficient energy store constantly available. In this way transmitting devices with a weak energy source can be used to transmit such infrared signals, in that they do not transmit a weak signal continuously, but rather a stronger signal for a limited time, the burst. In particular the dimensions and the weight of the transmitting device can be consequently reduced since the energy source usually represents the heaviest and least flexible element in terms of its dimensions, particularly in hand-held transmitters.

Figure 7:
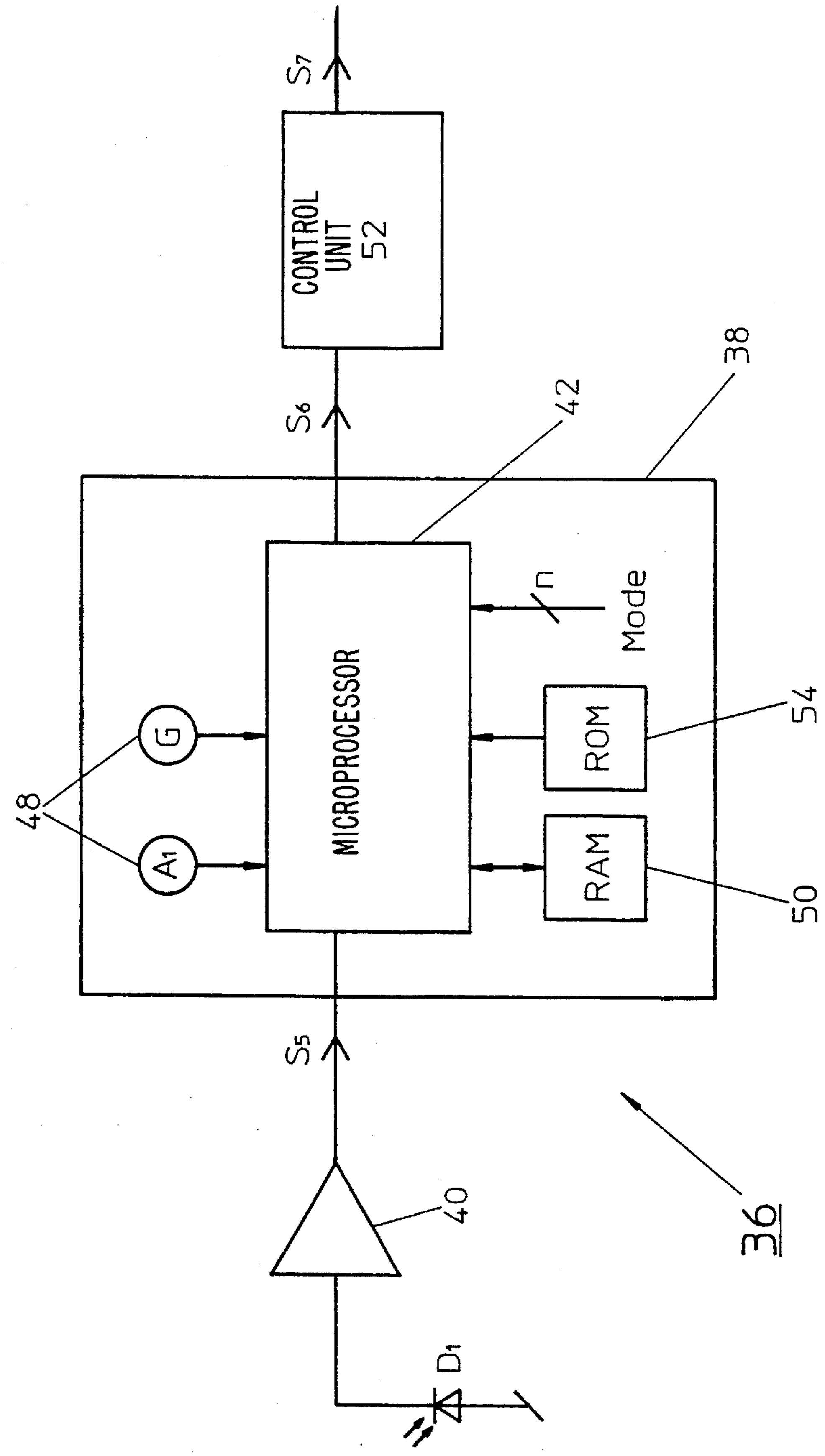

The receiver 36 (FIG. 7) thus evaluates the burst intervals between the burst packets received in each case, detects the various telegrams, and forwards them to an evaluation circuit 38 in accordance with the above coding.

The receiver 36 comprises a receive diode D1 which converts infrared signals into current, and a preamplifier 40 which conditions the weak current signals received in such a way that they can be processed further by a downstream second microprocessor 42 of the evaluation circuit 38.

Figure 8:
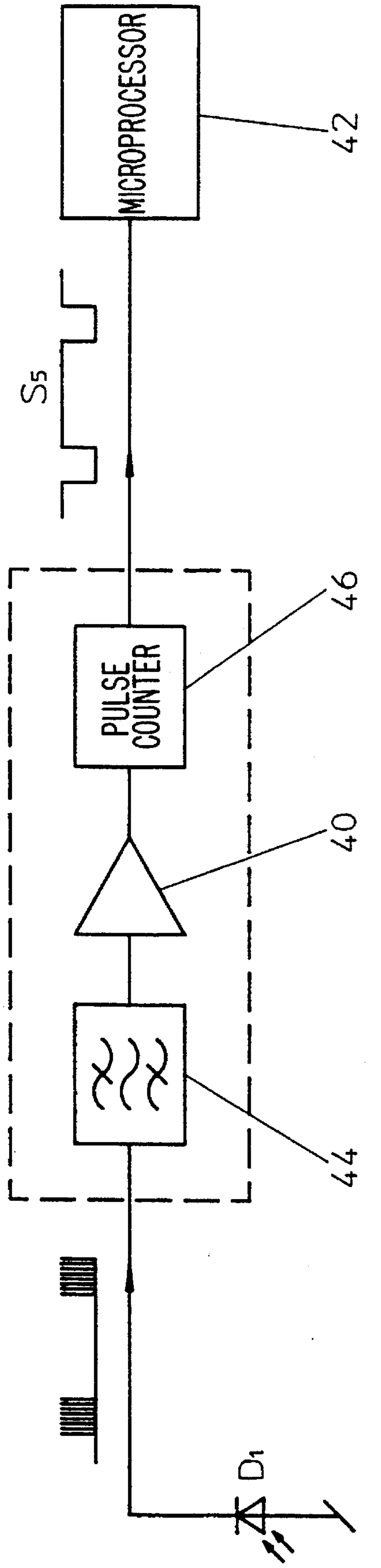

The infrared light signal (light burst packet) is converted into a current burst by the receive diode D1 in the receiver 36. A bandpass filter 44 (FIG. 8) can be used to filter said current burst, which bandpass filter allows the bursts to pass but is able to damp sufficiently all the interference not in the range of the carrier frequency. Most of the interfering frequencies in the infrared range are in the frequency range around 40 kHz (for example control gear, etc.).

The preamplifier 40 (FIG. 8) is designed in such a way that the signals received are first filtered and then amplified. After the amplification, the number of periods of the signal received is counted in a pulse counter 46 and, if the required number of periods have been received, a single receive pulse S5 is forwarded to the second microprocessor or ASIC 42, which then evaluates the intervals between said pulses.

The evaluation circuit 38 of the receiver 36 furthermore contains two coding switches 48 for determining the device address A1 (3 least significant bits) and the group address G (3 most significant bits). The second microprocessor 42 reads in said addresses when a command telegram is received and compares the address field with the address set at the receiver 36. If the addresses match, the command is stored for further processing, otherwise it is rejected. At the same time the command telegram is examined for faulty transmission with the aid of the data protection bits. The telegram is rejected if the received telegram is found not to be OK.

The evaluation circuit 38 also contains a memory 50 (RAM/EEPROM) for storing states for driving the control unit 52. The microprocessor 42 is notified via so-called MODE inputs which type is to be driven by the control unit 52, whereupon it then calls up the corresponding program in the program memory 54 (ROM). It is thus possible to generate a plurality of different control signals S6 for various control units 52 (for example generalized phase control, relay, etc.) with a single microprocessor 42, to be precise depending on the MODE inputs.

Figure 9:
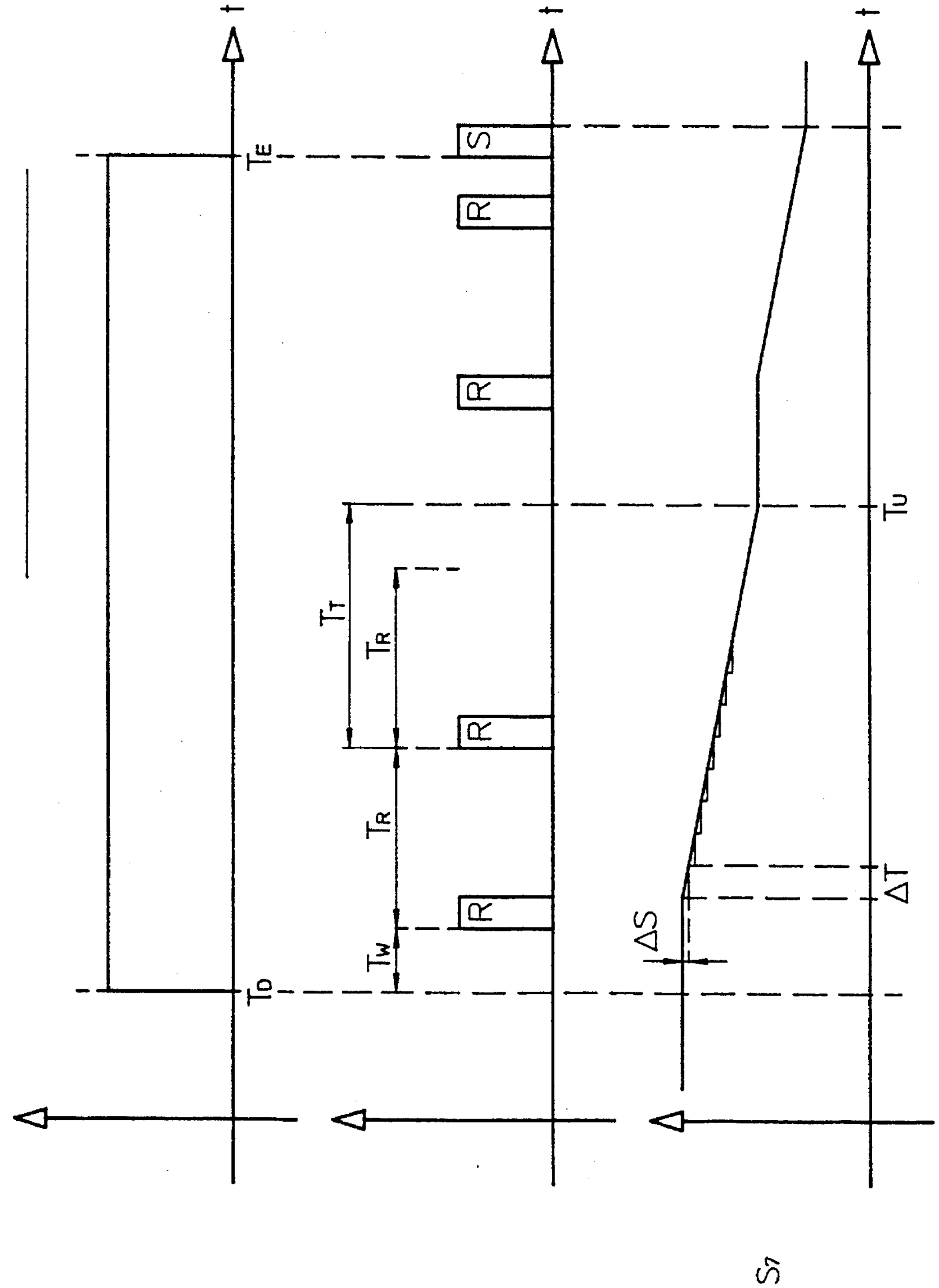

FIG. 9 shows a diagram for the transmitter transmission of a long key depression with infrared transmission of the telegrams using a limited power supply in the transmitting device for driving continuous and pseudo-continuous operations with only one key.

A key (for example T1) is pressed on the keypad 12 of the transmitter 10 at the time TD and is released again at the later time TE, as is illustrated in the upper diagram in FIG. 9.

If the key depression lasts longer than TW (TW is 400 ms), then the key depression is interpreted as "long", and from this time repeat signals R (or HOLD commands) are transmitted with the interval TR from the first (microprocessor 42) until the key is released at the time TE. In this connection, a shift signal S (or TOGGLE command) is sent by the microprocessor 42, and the transmission of the repeat signals R is terminated. At the same time the release of the key causes a reversal of direction for the control variable. A long key depression can be used, for example, to control a pseudo-continuous operation in such a way that the output control signal S7 of the control unit 52 of the receiver 36 is altered by a small amount delta S in small time steps delta T, such as the dimming of luminaires for example.

Owing to the limited power supply (battery) in the transmitter 10, the interval TR of the repeat signals must be selected to be sufficiently long (due to power consumption and hence increased life of the battery), but on the other hand it is to be possible for the receiver 36 to detect the end of the key depression as precisely as possible in order, when dimming for example, to be able to set the final value as precisely as possible. For this purpose, the shift signal S is transmitted when the key is released and the receiver 36 interprets this as the end of the key depression. It is thus possible to select a long interval TR between the repeat commands (800 ms). The time steps delta T for the control variable are short (approx. 60 ms) in relation to the interval between the repeat commands R, but the final value can nevertheless be set precisely because the shift signal is transmitted immediately the key is released.

An error in the transmission of the repeat signal R is not interpreted in the receiver 36 as the end of the key depression, which would indeed also result in a change of direction, but as an interruption, the duration TT until the detection of the interruption being selected to be longer than the duration of the interval TR of the repeat commands R (TT:1s). If such an interruption is determined at time TU, the control signal S7 is not changed until a repeat signal R is received again, no change of direction being indicated in this case. The non-appearance of the concluding shift signal S is interpreted as an interruption, that is to say a subsequent long key depression at the transmitter 10 is interpreted in the receiver 36 as the resumption of the original key depression.

Figure 10:
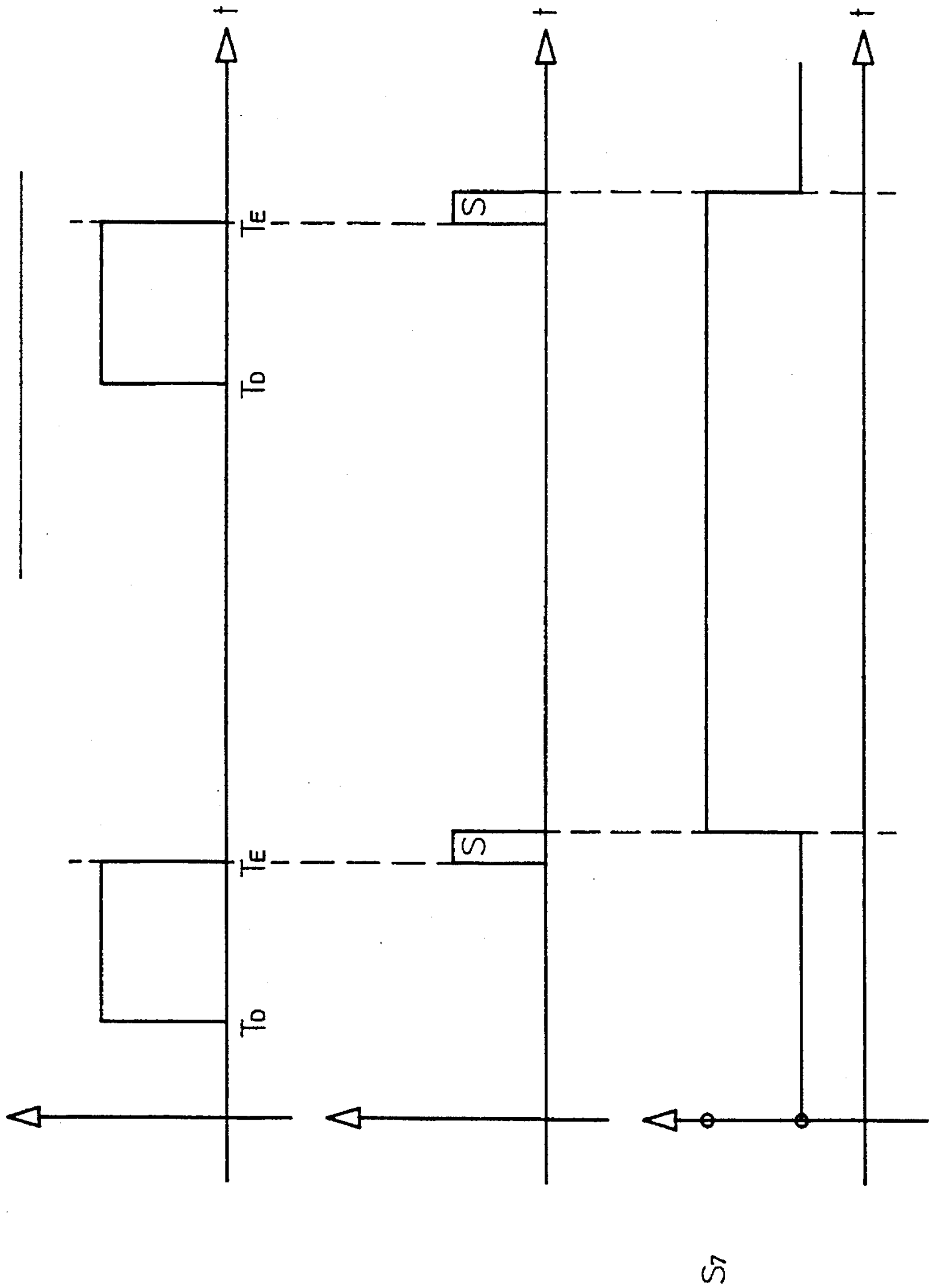

FIG. 10 shows the diagram of the transmitter transmission for a short key depression which lasts less than 400 ms. A shift signal S is transmitted by the microprocessor or ASIC 14 which switches the receiver 36 ON or OFF depending in each case on whether the current state was OFF or ON respectively.

The HOLD function is used to establish a logical connection between transmitter 10 and receiver 36, and serves for the transmission of a long key depression (>400 ms).

A short key depression generates a shift signal S or shift telegram, a long key depression generates repeat signals R or repeat telegrams, followed by a shift telegram S when the key is released.

We claim:

1. A method for the transmission of data in an infrared remote control system between a transmitter and a receiver, comprising the steps of:

transmitting repeat signals from the transmitter by the triggering of long and short key depressions and releases from a keypad;

generating a separate shift signal and terminating the transmission of the repeat signals from the release of at least one key on said keypad;

modulating by a burst-pause modulation technique for the transmission of the repeat and shift signals; and charging a storage means providing the required power and voltage amplitude for said step of transmitting by a DC/DC transformer; and selecting the number of burst periods per burst packet of the duration TB and the burst intervals TAO, TAI . . . TAN of said modulation technique to enable said step of charging during pauses in said step of transmitting.

2. A method according to claim 1, wherein said step of transmitting includes transmitting repeat signals after a key depression of longer than 400 milliseconds and being repeated at intervals of at most 1 second until the key is released, and further comprising the step of receiving said repeat and release signals and including the step of interpreting the non-reception of said repeat signals as interruptions of the key depression and not as terminations of the transmission of repeat signals.

3. The method according to claim 1, further comprising a step receiving a repeat signal during least an interval between repeat signals, and further comprising the step of generating a number of discrete control signals after said repeat signal is received.

4. A data transmission system for transmission between an infrared transmitter and an infrared receiver, said transmission comprising:

a keypad for generating, by long and short key depressions, respective repeat and release signals;

means for transmitting said repeat and release signals and including means for modulating said repeat and release signals by a burst-pause modulating technique;

means for generating a separate shift signal and terminating the transmission of said repeat signals upon the release of said key;

power storage means for providing the power and required voltage revel for said means for transmitting;

means for charging said power storage means during pauses in the transmission of said repeat and release signals; and means for selecting the number of burst periods per burst packet having the duration TB and the burst intervals TAO, TA1 to TAN for charging said power storage means during said duration TB.

5. The data transmission system according to claim 4, wherein said means for selecting selects data in burst packets each including 16 periods and said data comprises information in four different information units with four different burst intervals to have one information unit available in each case to mark the beginning and the end of the data sequence, and to represent the data states "0" and "1", and wherein the burst interval is at least ten times the length of the burst packet.

6. The data transmission system according to claim 4, wherein said means for charging further includes a magnetic transformer for generating transmitting power and said power storage means includes a capacitor for temporarily storing power.

7. The data transmission system according to claim 6, wherein said receiver including at least one receiver diode driven by said microprocessor, and a preamplifier, said receiver diode receiving said burst packets and are filtered by said preamplifier to provide pulses, and wherein said microprocessor evaluates the intervals between said pulses to detect the various data.

8. A method for the transmission of data in an infrared remote control system between a transmitter and a receiver, comprising the steps of:

transmitting repeat signals from the transmitter by the triggering of long and short key depressions and releases from a keypad;

generating a shift signal and terminating the transmission of the repeat signals from the release of at least one key on said keypad;

modulating by a burst-pause modulation technique for the transmission of the repeat and shift signals;

charging a storage means providing the required power and voltage amplitude for said step of transmitting by a DC/DC transformer;

selecting the number of burst periods per burst packet of the duration TB and the burst intervals TAO, TAI to TAN of said burst modulation technique to enable said step of charging during pauses in said step of transmitting;

said step of transmitting includes transmitting repeat signals after a key depression of longer than 400 milliseconds and are repeated at intervals of at most 1 second until the key is released;

and further comprising the step of receiving said repeat and release signals and including the step of interpreting a non-reception of said repeat signals as interruptions of the key depression and not as terminations of the transmission of repeat signals; and said step of receiving further comprising the step of generating a number of discrete control signals after receiving a repeat signal during at least an interval between repeat signals.

9. A data transmission system for transmission between an infrared transmitter and an infrared receiver, said infrared transmitter, comprising:

a keypad for generating, by long and short key depressions, respective repeat and release signals;

means for transmitting said repeat and release signals and including means for modulating said repeat and release signals by a burst-pause modulating technique;

means for generating a shift signal and terminating the transmission of said repeat signals upon the release of said key;

power storage means for providing the power and required voltage level for said means for transmitting;

means for charging said power storage means during pauses in the transmission of said repeat and release signals;

means for selecting the number of burst periods per burst packet having the duration TB and the burst intervals TAO, TA1 to TAN for charging said power storage means during said duration TB;

said transmitter further including a magnetic transformer for generating transmitting power and a capacitor for temporarily storing power; and said data transmission system further comprising:

an infrared receiver;

said infrared receiver includes at least one receive diode driven by said microprocessor and a preamplifier so that the burst packets received by said receiver diode are filtered by said preamplifier, and wherein said microprocessor evaluates the intervals between the pulses to detect the various data;

said means for charging further includes a magnetic transformer for generating transmitting power and said power storage means includes a capacitor for temporarily storing power; and said receiver including at least one receiver diode driven by said microprocessor, and a preamplifier, said receiver diode receiving said burst packets and are filtered by said preamplifier to provide pulses, and wherein said microprocessor evaluates the intervals between said pulses to detect the various data.

* * * * *